(12) United States Patent
Molnár

(10) Patent No.: US 11,376,533 B2
(45) Date of Patent: Jul. 5, 2022

(54) WALL MOUNTING SYSTEM

(71) Applicant: Camfil AB, Stockholm (SE)

(72) Inventor: Martin Molnár, Vel'ke Vozokany (SK)

(73) Assignee: CAMFIL AB, Stockholm (SE)

( * ) Notice: Subject to any disclaimer, the term of this patent is extended or adjusted under 35 U.S.C. 154(b) by 151 days.

(21) Appl. No.: 16/828,208

(22) Filed: Mar. 24, 2020

(65) Prior Publication Data

US 2020/0306673 A1 Oct. 1, 2020

(30) Foreign Application Priority Data

Mar. 26, 2019 (SE) .................... 1950369-7

(51) Int. Cl.
*B01D 35/30* (2006.01)

(52) U.S. Cl.
CPC .... *B01D 35/306* (2013.01); *B01D 2201/0415* (2013.01); *B01D 2201/30* (2013.01);
(Continued)

(58) Field of Classification Search
CPC .......... B01D 35/306; B01D 2201/0415; B01D 2201/30; B01D 2201/4023;
(Continued)

(56) References Cited

U.S. PATENT DOCUMENTS

| 3,999,969 A * | 12/1976 | Shuler .................. B01D 46/00 55/418 |
| 6,110,245 A | 8/2000 | Schlag et al. |
| 2004/0077304 A1 | 4/2004 | Pfannenberg |

FOREIGN PATENT DOCUMENTS

| EP | 2191882 A2 | 6/2010 |
| EP | 2196250 A2 | 6/2010 |

OTHER PUBLICATIONS

Office Action dated Oct. 1, 2019 relating to Swedish Patent Application No. 1950323-4.
(Continued)

*Primary Examiner* — Madeline Gonzalez
(74) *Attorney, Agent, or Firm* — Dinsmore & Shohl LLP

(57) ABSTRACT

A clamping system (1) for mounting a filter housing (10) to a wall structure (20), said clamping system including a filter housing clamping flange (2) arranged on a front side of the filter housing (10), and being adapted to abut a front side (20*a*) of the wall structure (20); a first locking plate (4, 44) having a longitudinal direction (y), and including a locking plate clamping surface (5, 45) extending along a longitudinal side of the locking plate (4) and being adapted to abut a rear side (20*b*) of the wall structure (20); a first engagement component (3*a*, 43*a*) associated with a filter housing wall (11) on a distance from the filter housing clamping flange (2); and a puller (6), said locking plate being configured to cooperate with the puller (6) via an abutment surface (7) associated with the locking plate (4; 44) and being adapted to engage with a part of the puller (6), and said locking plate (4; 44) further being configured to cooperate with the first engagement component (3*a*, 43*a*) via a second engagement component (8*a*, 48*a*) arranged in the locking plate, wherein one of said first and second engagement components (3*a*, 43*a*; 8*a*, 48*a*) is a retainer bracket (12*a*, 42*a*), and the other of said first and second engagement components (3*a*, 43*a*; 8*a*, 48*a*) is a push edge (13*a*, 46*a*) comprised in a push opening (14*a*, 50), said push edge (13*a*, 46*a*) being an inclined edge adapted to engage with the retainer bracket, said puller (6) being configured to manipulate the abutment surface (7, 47) so as to move the locking plate (4, 44) in the longitudinal direction thereof, such that the inclined push edge (13*a*, 46*a*) of the push opening and the retainer bracket (12*a*, 42*a*) interact to push the locking plate (4) in a (Continued)

transverse direction thereof and toward the filter housing clamping flange (2), thus clamping the wall structure (20) between the filter housing clamping flange (2) and the locking plate clamping surface (5, 45).

16 Claims, 5 Drawing Sheets

(52) U.S. Cl.
CPC ............ *B01D 2201/4023* (2013.01); *B01D 2201/4092* (2013.01)

(58) Field of Classification Search
CPC .......... B01D 2201/4092; B01D 46/001; B01D 46/0002; B01D 46/42; B01D 35/30; F24F 13/28; F24F 8/10; F24F 8/80
USPC ....... 210/236, 153, 232, 249, 455, 473, 485, 210/494.3, 495, 493.3; 55/490, 496, 504, 55/508, DIG. 31
See application file for complete search history.

(56) References Cited

OTHER PUBLICATIONS

European Search Report relating to European Patent Application No. 20164777.3-1205 dated Sep. 14, 2020.

\* cited by examiner

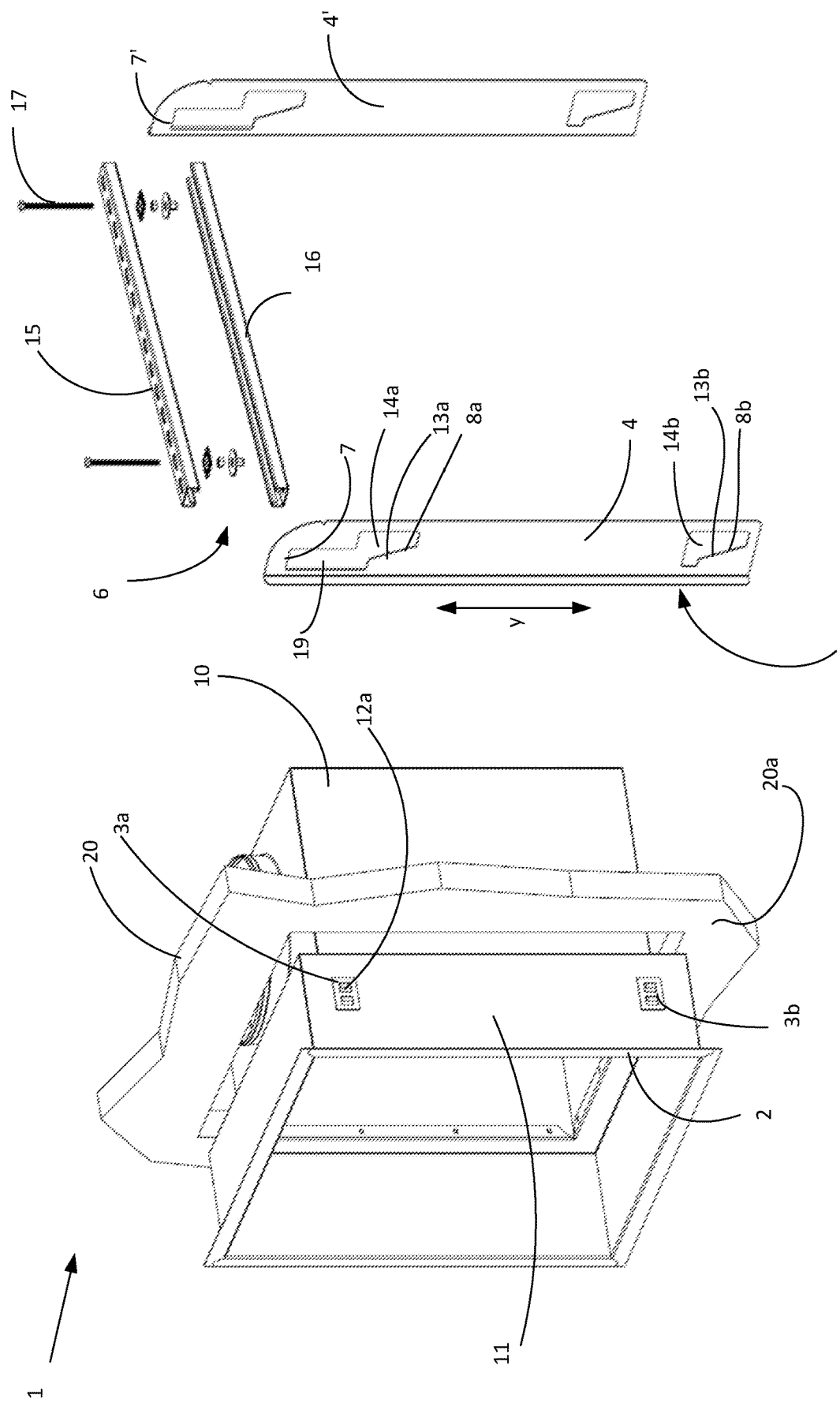

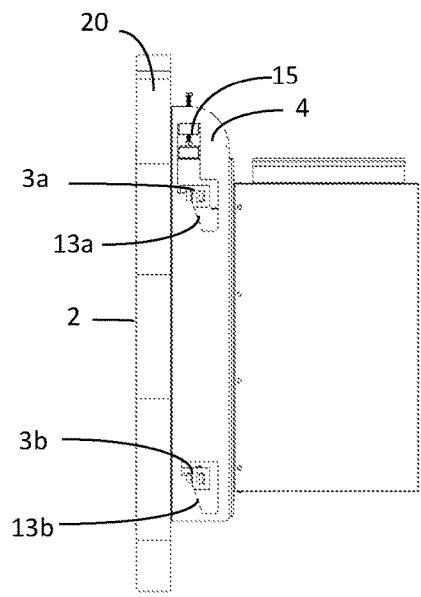
Fig. 2a
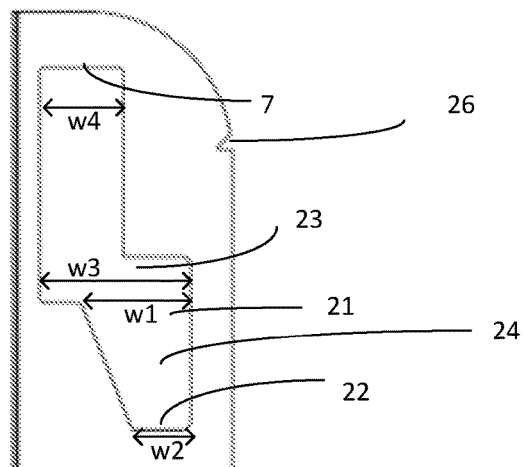
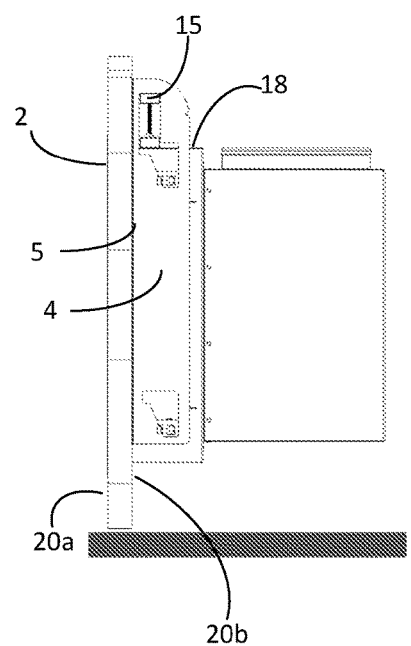
Fig. 2b
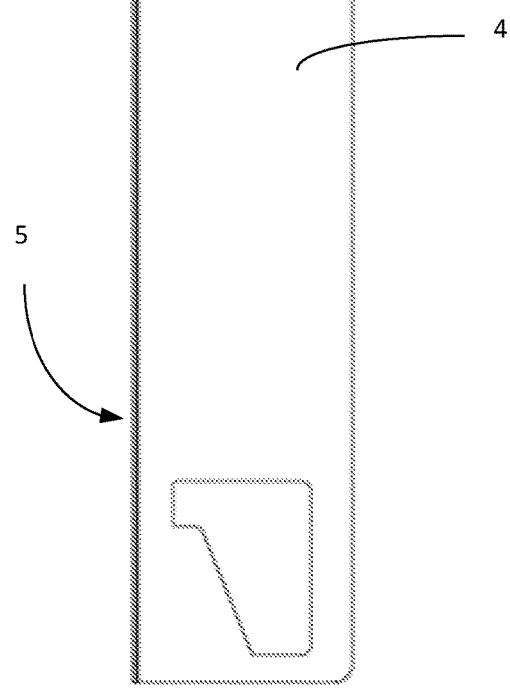
Fig. 3

WALL MOUNTING SYSTEM

CROSS-REFERENCE TO RELATED APPLICATIONS

This application claims priority to Swedish Patent Application 1950369-7 filed Mar. 26, 2019, the contents of which are hereby incorporated by reference in their entirety.

TECHNICAL FIELD

The present disclosure relates to a clamping system for mounting a filter housing to a wall structure and to a clamping assembly for use in the clamping system.

BACKGROUND ART

Filter housings for use in air filtration systems can typically be installed in the wall of a space where air filtrations is needed by insertion of the filter housing through an opening in the wall adapted to the shape and size of the filter housing and securing it from behind by screwing a fixation element against the wall. In some situations, the space between the filter housing and another wall or other building component can be very narrow, so it can be difficult to get sufficient access the area behind the wall for the fixation element to be easily fastened.

SUMMARY OF THE INVENTION

The present disclosure aims at providing a clamping system for mounting a filter housing to a wall structure and a clamping assembly for use in the clamping system that allows easy clamping of the filter housing to a wall structure also when the space behind the wall and next to the filter housing is very narrow and difficult to access. This is obtained by a clamping system for mounting a filter housing to a wall structure, which clamping system includes a filter housing clamping flange arranged on a front side of the filter housing, and being adapted to abut a front side of the wall structure; a first locking plate having a longitudinal direction (y), and including a locking plate clamping surface extending along a longitudinal side of the locking plate and being adapted to abut a rear side of the wall structure; a first engagement component associated with a filter housing wall on a distance from the filter housing clamping flange; and a puller. The locking plate is configured to cooperate with the puller via an abutment surface associated with the locking plate and being adapted to engage with a part of the puller, and is further configured to cooperate with the first engagement component via a second engagement component arranged in the locking plate, wherein one of said first and second engagement components is a retainer bracket, and the other of said first and second engagement components is a push edge comprised in a push opening, said push edge being an inclined edge adapted to engage with the retainer bracket. The puller is configured to manipulate the abutment surface so as to move the locking plate in the longitudinal direction thereof, such that the inclined push edge of the push opening and the retainer bracket interact to push the locking plate in a transverse direction thereof and toward the filter housing clamping flange, thus clamping the wall structure between the filter housing clamping flange and the locking plate clamping surface.

The puller preferably comprises a puller element and a support element connected to the puller element via a distance regulating component, which is configured to act on the puller element and the support element so force the puller element away from the support element. The support element is preferably adapted to rest against and be supported by an external surface of the filter housing, and the distance regulating component may suitably be a screw rod connected to the puller element via a screw connection.

The abutment surface of the locking plated is preferably comprised in a pull opening arranged in the locking plate, wherein said puller is adapted to be inserted into the pull opening and to abut against the abutment surface.

The first and second engagement components clamping system preferably form a first set of engagement components, and wherein the clamping system further comprises a second set of engagement components comprising a third and a fourth engagement component located on the filter housing wall and on the locking plate, respectively, and having the same configuration as the first and second engagement components, and being positioned on a distance from the first set of engagement components in the longitudinal direction (y) of the locking plate. The push opening may advantageously have a wider end at an end closest to the abutment surface, and a narrower end farthest from the abutment surface, said wider end having a width in a transverse direction of the locking plate, which is greater than the width of the narrower end. Further, the push opening preferably comprises an insertion part at the wider end thereof, and a tapering part extending from the insertion part toward the at the narrower end, where the tapering part is delimited on a side closest to the clamping surface by the inclined push edge. The clamping system may preferably further comprise a positioning marking located at an end of the locking plate where the pull opening is located, and on a distance in the longitudinal direction (y) from the second engagement component, which corresponds to the distance in the longitudinal direction (y) between the first engagement component associated with a filter housing wall and an external surface of the filter housing.

The clamping system may also preferably comprise a second locking plate, having the same but mirrored configuration as the first locking plate, thus being configured to engage with the filter housing and clamp it against the wall structure in the same way as the first locking plate, said puller being configured to abut an abutment surface arranged on the second locking plate, so as to simultaneously manipulate both abutment surfaces of the first and second locking plates so as to move them in a longitudinal direction, thereby causing a movement of the locking plates in a transverse direction toward the wall structure.

The present disclosure also relates to a clamping assembly for use in the clamping system described above, comprising a first locking plate including an abutment surface and at least one engagement component arranged thereon, said at least one engagement component being a retainer bracket or an inclined push edge comprised in a push opening, and; a puller configured to abut the abutment surface, said abutment surface preferably being comprised in a pull opening arranged in the locking plate and said puller preferably being adapted to be inserted into the pull opening and to abut against the abutment surface. The puller may preferably comprise a puller element and a support element connected to the puller element via a distance regulating component, which is configured to act on the puller element and the support element so force the puller element away from the support element, said distance regulating component preferably being a screw rod connected to the puller element via a screw connection. The push opening preferably has a wider end at an end closest to the abutment surface, and a narrower end farthest from the abutment surface, said wider end having a width in a transverse direction of the locking plate, which is greater than the width of the narrower end, and wherein the push opening preferably comprises an insertion part at the wider end thereof, and a tapering part extending from the insertion part toward the at the narrower end, where the tapering part is delimited on a side closest to the clamping surface by the inclined push edge. The locking plate preferably further comprising a positioning marking located at an end of the locking plate where the pull opening is located, and on a distance from the second engagement component in a longitudinal direction (y) of the locking plate, which distance corresponds to the distance in the longitudinal direction (y) between the first engagement component associated with a filter housing wall and an external surface of the filter housing. The clamping assembly may preferably further comprise a second locking plate, having the same but mirrored configuration as the first locking plate, said puller being configured to abut an abutment surface arranged on the second locking plate, so as to simultaneously manipulate both abutment surfaces of the first and second locking plates.

BRIEF DESCRIPTION OF THE DRAWINGS

Examples of the clamping system and clamping assembly of the present disclosure are illustrated in the appended schematic drawings. FIGS. 1a-4b illustrate an example of a first embodiment, and FIGS. 5-6e illustrate an example of a second embodiment.

FIG. 1a is a front perspective view of a filter housing upon insertion into a wall structure;

FIG. 1b is a rear perspective view of a clamping assembly of an example of the first embodiment;

FIG. 2a is a side view of the clamping system of the first embodiment after engagement of the locking plate to the side wall of the filter housing, but before it has been forced into clamping position;

FIG. 2b is a side view of the clamping system in FIG. 2a, after the locking plate has been forced into clamping position;

FIG. 3 is a side view of a locking plate;

FIG. 4b is an enlarged view of the area in FIG. 4a where the puller is in engagement with the pull opening of the locking plate;

FIG. 5 is a side view of an example of the second embodiment, showing a filter housing inserted into a wall structure and a locking plate engaged with the filter housing;

FIG. 6e is a side view of the locking plate;

DETAILED DESCRIPTION

The clamping system of the present disclosure is especially adapted for mounting a filter housing to a wall structure. Suitable locations for the filter housing can be for example rooms or other spaces in industrial buildings, such as a clean room, or in public or domestic buildings. The filter housing is typically in the form of a box having four rectangular side walls and a rear wall, and being open toward the room, but other shapes can also be used. One of the walls will have an opening for connection with an air ventilation duct. When mounting the filter housing into the wall, it is inserted into an opening in the wall, which is large enough to receive the filter housing, but small enough for the clamping flange to extend outside the opening.

The wall structure is typically a vertical wall in a space where air filtration is desired, such as an inner wall. The clamping system can be used also for mounting the filter housing to a non-vertical wall, and if the wall structure has such an extension that the clamping flange cannot support the filter housing in the opening in the wall structure, temporary support or clamping elements may be used.

The principle of the clamping system is to clamp the wall structure between clamping elements located on the front side (room side) and on the rear side (behind the wall), where the rear side clamping element has such a construction that when it is moved in its longitudinal direction by means of a puller, it will at the same time move transversely towards the wall and clamp the wall together with the front side clamping element. The clamping system thus includes a clamping flange arranged on a front side of the filter housing, i.e. on the side facing the room, which is adapted to abut a front side of the wall structure and to act as a clamping element when it cooperates with the rear side clamping element. The clamping flange can extend around the entire periphery of the front side of the filter housing or along parts of the periphery to an extent which is efficient to perform the clamping of the filter housing to the wall structure. The clamping flange can also serve to temporarily support the filter housing during mounting when inserted into the opening in the wall. The rear side clamping element is in the form of a first locking plate, which has a clamping surface adapted to abut a rear side of the wall structure. The clamping surface extends along a longitudinal side of the locking plate and is intended to be directed towards the wall when mounted to the filter housing.

Figure 4A:
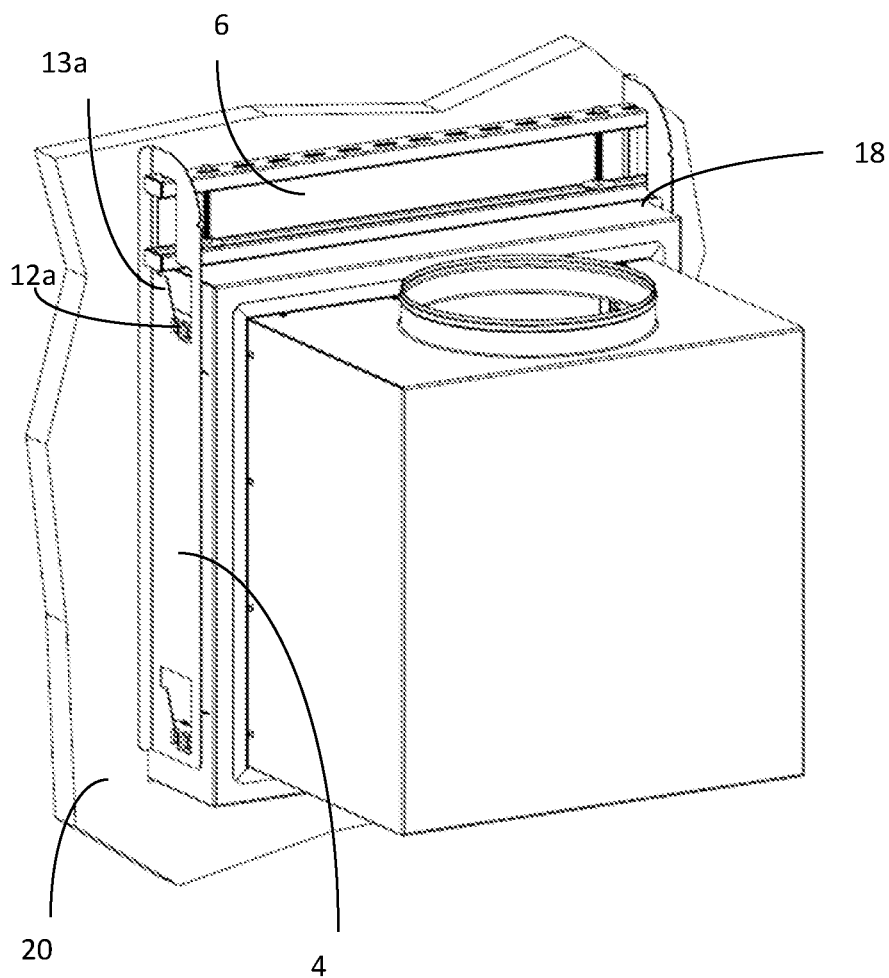
FIG. 4a is a rear perspective view of a filter housing after the locking plate has been forced into clamping position.
Figure 4B:
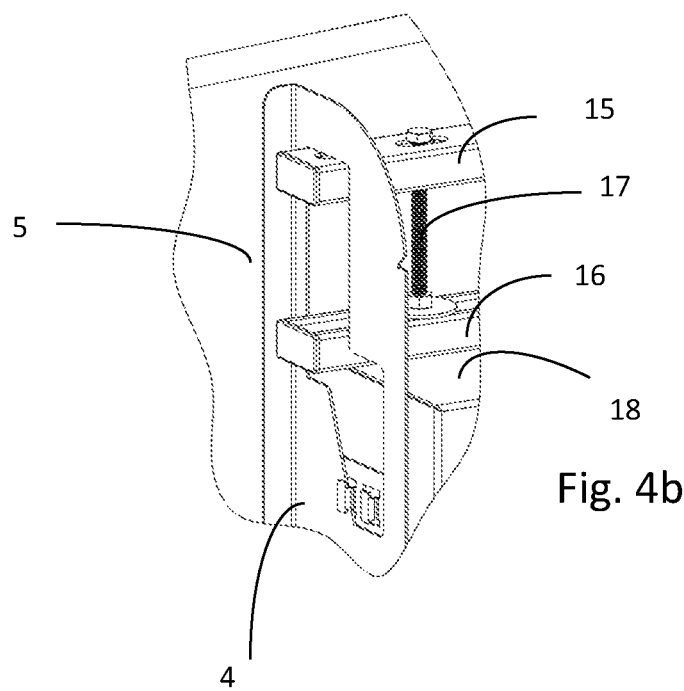
Figure 5:
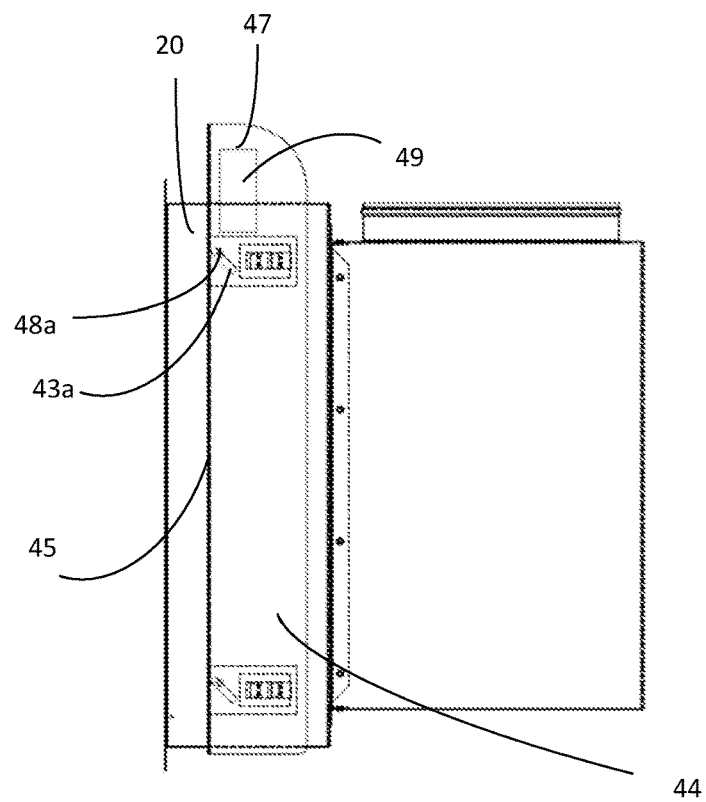
Figure 6A:
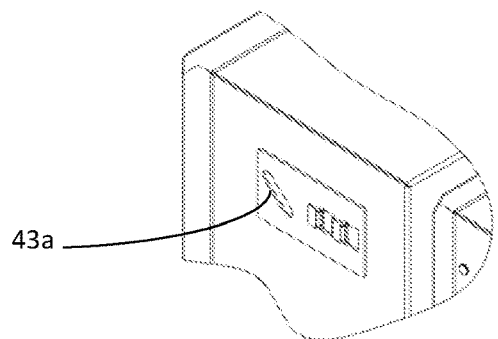
FIG. 6a is a detail view of the side wall and the first engagement component.
Figure 6B:
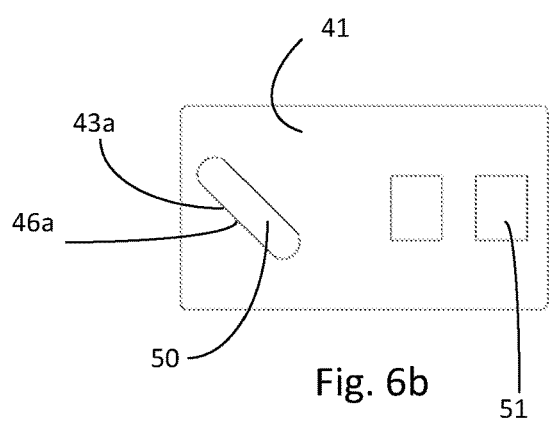
FIG. 6b is a view of a push opening element of the first engagement component.
Figure 6C:
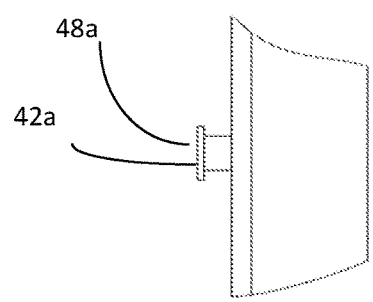
FIG. 6c is a detail view of the locking plate and the second engagement component.
Figure 6D:
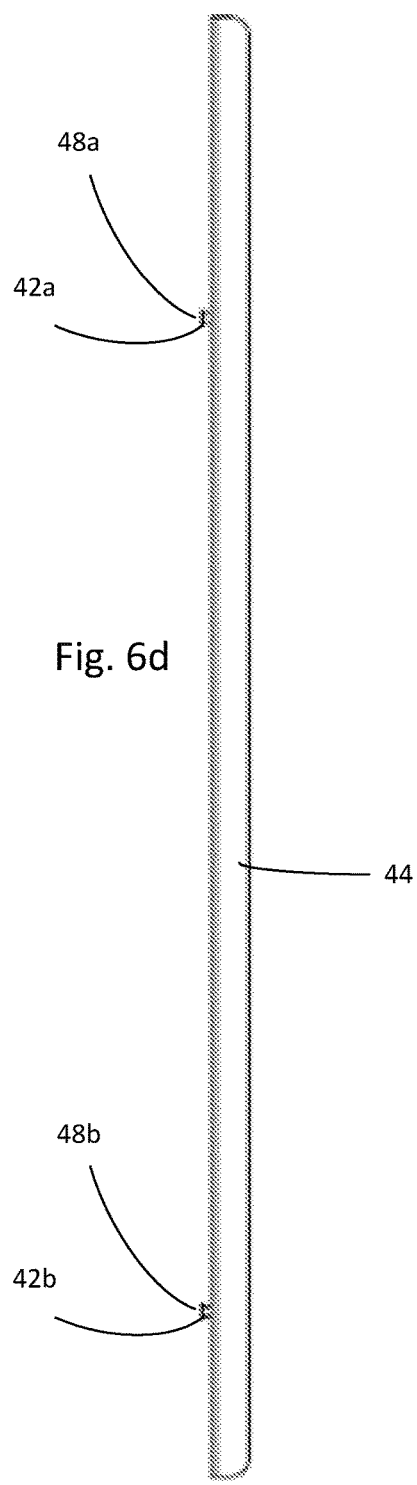
FIG. 6d is a front view of the locking plate.
Figure 6E:
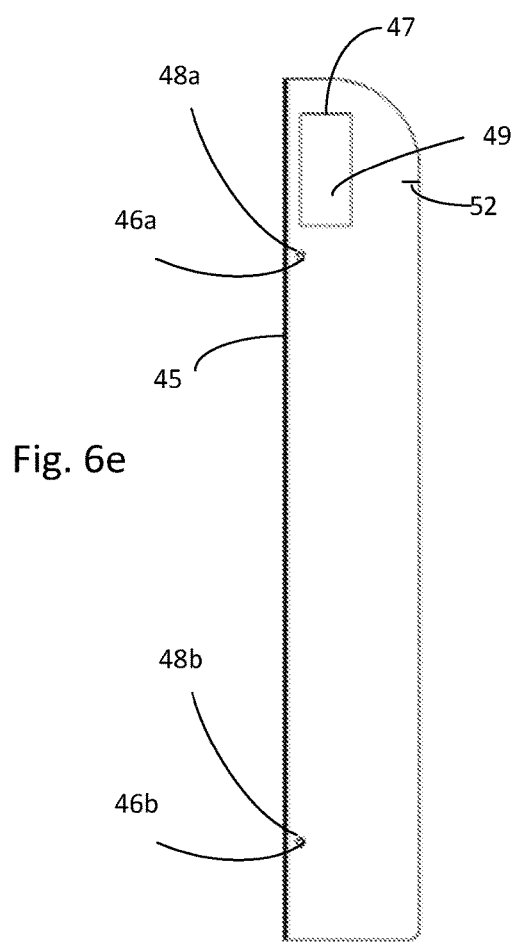

The locking plate is configured to cooperate with the filter housing via a set of engagement components, wherein a first engagement component is associated with one of the filter housing walls, and a second engagement component is associated with the locking plate. In a first embodiment, the first engagement component is a retainer bracket located on a distance from the filter housing clamping flange, and the second engagement component is be a push edge comprised in a push opening in the locking plate. In a second embodiment, the first engagement component on the filter housing is a push edge comprised in a push opening and the second engagement component is a retainer bracket located on the locking plate. In both cases, the push edge is an inclined edge adapted to engage with the retainer bracket, and the retainer bracket preferably includes a protruding element that can extend over the inclined push edge, so that in can slide along the inclined edge when the locking plate is moved in its longitudinal direction. FIGS. 1a-4b schematically illustrate an example of a first embodiment and FIGS. 5-6e illustrate an example of a second embodiment. The locking plate may suitably have a length exceeding the length of the side of the filter housing that is to be clamped.

The puller is designed to be able to move the locking plate in a longitudinal direction, parallel to the surface of the wall structure. This can be obtained by means of a lifting or pushing force exerted by the puller on the locking plate. The locking plate is configured to cooperate with the puller via an abutment surface in or on the locking plate, and is adapted to engage with a part of the puller. When the puller is moved, it will act on the abutment surface so as to move the locking plate in the longitudinal direction thereof, such that the inclined push edge of the push opening and the retainer bracket interact to push the locking plate in a transverse direction thereof and toward the filter housing clamping flange until the locking plate abuts the rear side of the wall structure, and until the desired clamping force has been obtained, thus clamping the wall structure between the filter housing clamping flange and the locking plate clamping surface. By means of the interaction between the retainer bracket and the inclined push edge, the clamping system can be used for mounting a filter housing to a wall structure, regardless of the thickness of the wall structure, since the clamping assembly can adapt to the wall thickness by exerting an adequate clamping force with the retainer bracket located at any position along the inclined push edge.

Figure 7:
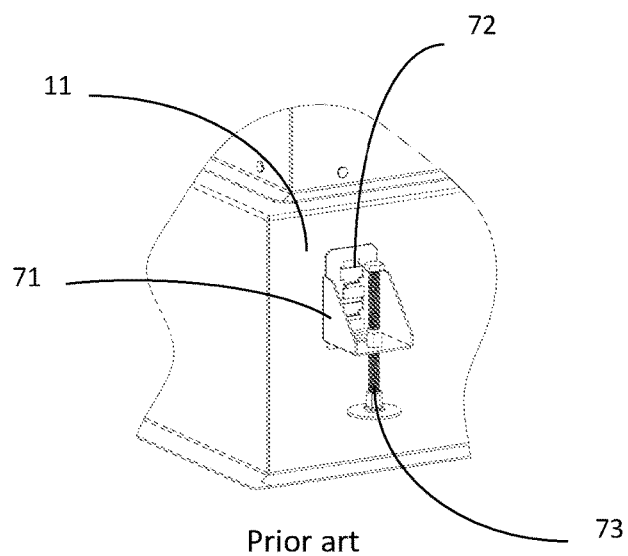
FIG. 7 schematically illustrates a conventional fixation element.

When mounting the filter housing to the wall structure, the filter housing is first inserted into an opening in the wall structure so that the first engagement component on the filter housing becomes located behind the wall, while the clamping flange abuts the front side of the wall structure. The locking plate is then positioned near the filter housing wall so that the second engagement component is close to the first engagement component, and the first and second engagement components are engaged with each other. This is easy, since one of the engagement components is an inclined edge in an opening and the other is a retainer bracket and they are adapted to engage with each other. Thereafter, the puller is manipulated so as to move the locking plate in its longitudinal direction, whereby the locking plate is forced to move transversely toward the wall structure, thus clamping the wall structure between the clamping surface of the locking plate and the clamping flange of the filter housing. No direct access to the area where the clamping actually occurs is needed, since the locking plate can be inserted between the filter housing and an adjacent wall, e.g. from above, and the puller that forces the locking plate to move against the wall can be controlled from a position on a distance from the clamping area. This is a great advantage when a filter housing is to be mounted in a space where the space between the filter housing and adjacent building panels is very narrow, so that it is difficult access the area where the filter housing needs to be clamped to the wall. Conventional fixation elements, such as the one schematically illustrated in FIG. 7, require that the mounting staff can gain full access to the rear side of the wall structure to which the filter housing is to be mounted.

The puller preferably comprises a puller element and a support element connected to the puller element via a distance regulating component. The distance regulating component may suitably be a screw rod, connected to the puller element via a screw connection, and is configured to act on the puller element and the support element so force the puller element away from the support element. The support element is preferably adapted to rest against and be supported by an external surface of the filter housing. The puller element can for example be an elongated bar, preferably made of metal. The support element can have any shape, that is adapted to be supported by the external surface of the filter housing, and can for example be in the form of an elongated bar.

For example, if the space above the filter housing on the rear wall side can be freely accessed, the locking plate can be inserted from above, and the puller is placed above the filter housing that the support element can rest on top thereof. The abutment surface of the locking plated is then directed upwards and is accessible for engagement with the puller above the filter housing, and the inclined push edge has a first end point in a direction toward the abutment surface (upper end point), which is closer to the clamping surface of the locking plate, and a second end point in a direction away from the abutment surface (lower end point), which is less close to the clamping surface of the locking plate. The clamping is achieved by moving the locking plate upwards, whereby the locking plate is forced to move sideways against the rear side wall. The directions of this example may be referred to in the description below. However, it should be noted that the filter housing and the locking plate can be mounted in any direction, so that the movement of the locking plate could as well be downwards or horizontal, or at an angle with respect to a horizontal line.

The abutment surface of the locking plated is preferably comprised in a pull opening arranged in the locking plate, so that it forms an edge of the pull opening located in the pulling direction, thereby allowing an easy way of engaging the puller with the abutment surface. The puller is then adapted to be inserted into the pull opening and to abut against the abutment surface.

The clamping system is preferably designed to have two sets of engagement components along the longitudinal direction of the locking plate, to allow clamping along the full length of the filter housing and locking plate. Thus, the above described first and second engagement components may form a first set of engagement components, and a second set of engagement components, comprising a third and a fourth engagement component can be arranged on the filter housing wall and on the locking plate, respectively. The third and a fourth engagement components will have the same configuration as the first and second engagement components, respectively, and will be positioned on a distance from the first set of engagement components in the longitudinal direction (y) of the locking plate, on a line parallel to the longitudinal direction (y). By this arrangement, two points where clamping forces act on the wall structure can be obtained by moving the locking plate by means of the puller.

The push opening may advantageously have a wider end at an end closest to the abutment surface (upward in the above example), and a narrower end farthest from the abutment surface (downward in the above example), so that the wider end has a width in a transverse direction of the locking plate, which is greater than the width of the narrower end. This facilitates the engagement of the retainer bracket with the inclined push edge, since the locking plate can be placed against the filter housing wall so that retainer is located at the wide end of the push opening. Further, the push opening can suitably comprise an insertion part at the wider end thereof, and a tapering part extending from the insertion part toward the at the narrower end, where the tapering part is delimited on a side closest to the clamping surface by the inclined push edge. This facilitates the engagement of the locking plate to the filter housing even further, as the insert opening enables easier accommodation of the retainer bracket.

The clamping system may further preferably comprise a positioning marking located at an end of the locking plate where the pull opening is located, and on a distance in the longitudinal direction (y) from the second engagement component, which corresponds to the distance in the longitudinal direction (y) between the first engagement component associated with a filter housing wall and an external surface of the filter housing. The positioning marking is placed so that when the locking plate is held so that the positioning marking is located adjacent a certain predetermined part of the filter housing, the push opening will cover the retainer bracket. Thereby, correct positioning of the locking plate with respect to the filter housing is enabled, also when the filter housing is to be mounted in an area where the first, and the optional third, engagement component(s) are not visible for the mounting staff.

The filter housing will typically need to be clamped on two opposing sides, to be sufficiently secured to the wall structure. This can be obtained by means of the above clamping system on one side, and conventional screw clamping on the other side, but preferably the above clamping system may further comprises a second locking plate, having the same but mirrored configuration as the first locking plate. All features described above for the first locking plate apply to the second locking plate as well. This means that a first engagement component is associated with the filter housing also on the opposite side thereof, having the same, but mirrored configuration. The second locking plate is thus configured to engage with the filter housing and clamp it against the wall structure in the same way as the first locking plate. The puller can then be configured to abut an abutment surface arranged on the second locking plate, and can accordingly simultaneously manipulate both abutment surfaces of the first and second locking plates so as to move them in a longitudinal direction, thereby causing a movement of the locking plates in a transverse direction toward the wall structure. This allows for a more effective mounting of the filter housing to the wall structure since, the filter housing can be clamped against the wall structure by manipulation of one puller only.

The present disclosure also relates to a clamping assembly for use in the clamping system described above, where all component have the features and the functions described above. The clamping assembly comprises the first locking plate with the abutment surface comprised in the pull opening, and at least one engagement component in the form of retainer bracket or an inclined push edge comprised in a push opening arranged thereon, and a puller configured to abut the abutment surface. As mentioned above, the puller preferably comprises a puller element and a support element connected to the puller element via a distance regulating component (e.g. screw rod connected to the puller element via a screw connection), configured to act on the puller element and the support element to force the puller element away from the support element. The push opening preferably has a wider end and a narrower end as described above, and may comprise an insertion part and a tapering part delimited by the inclined push edge. The locking plate may further comprise the positioning marking. Preferably, the clamping assembly comprises a second locking plate, as described above.

The clamping system and clamping assembly mentioned above will now be described by reference to the drawings schematically illustrating examples thereof. As shown in the drawings, the clamping system 1 for mounting a filter housing 10 to a wall structure 20. FIGS. 1a-4b illustrate an example of a first embodiment of the clamping system 1 and clamping assembly. FIG. 1a shows the filter housing 10 upon insertion into the wall structure 20. The filter housing has a clamping flange 2 arranged on the front side 20a of the filter housing 10. Engagement components 3a, 3b in the form of a retainer brackets 12a, 12b are located on the filter housing wall 11 on a distance from the filter housing clamping flange 2. FIG. 1b shows the clamping assembly used in the clamping system, wherein a first locking plate 4 includes a locking plate clamping surface 5, which extends along a longitudinal side of the locking plate and is adapted to abut the rear side 20b of the wall structure 20. In this example the assembly includes a second locking plate 4' having the same but mirrored configuration. The two locking plates are positioned on opposite sides of the filter housing.

The locking plates are configured to cooperate with a puller 6 via the abutment surfaces 7, 7' in the locking plate 4, 4', so as to simultaneously manipulate both abutment surfaces 7; 7' to move the locking plates in a longitudinal direction, thereby causing a movement of the locking plates in a transverse direction toward the wall structure 20. The locking plates include engagement components 8a, 8b, which cooperate with the engagement components 3a, 3b on the filter housing. In this embodiment, the engagement component of the locking plate is a push edge 13a, 13b comprised in a push opening 14a, 14b. The push edge 13a, 13b is an inclined side edge of the push opening, having an upper end point closer to the clamping surface 5. The puller 6 comprises a puller element 15 and a support element 16 connected to the puller element 15 via a distance regulating screw rod component 17 connected to the puller element 15 via a screw connection. The screw rod can act on the puller element 15 and the support element 16 to force the puller element 15 away from the support element 16. FIGS. 4a and 4b show how the support element is adapted to rest against and be supported by an external surface 18 of the filter housing 10.

The puller element 15, here in the form of an elongate bar, can be inserted into the pull opening 19 to abut against the abutment surface 7, 7', and when the puller element is forced away from the support element and thus also away from the upper surface 18 of the filter housing the locking plates 4, 4' will be forced to move in the longitudinal direction (y) thereof, such that the inclined push edge 13a, 13b of the push opening and the retainer bracket 12a, 12b will interact to push the locking plates in a transverse direction toward the filter housing clamping flange 2, thus clamping the wall structure 20 between the filter housing clamping flange 2 and the locking plate clamping surface 5. FIGS. 2a and 2b show the clamping system of the first embodiment after engagement of the locking plate to the side wall of the filter housing, before and after it has been forced into clamping position. The clamping system in its clamped position also shown from the rear side in FIGS. 4a and 4b.

As shown in FIG. 3, the push opening has a wider upper end 21 having a width w1 in a transverse direction of the locking plate, which is greater than the width w2 of a narrower lower end 22. In this example, the push opening also comprises an insertion part 23 at the upper wider end 21, and a tapering part 24 extending from the insertion part 21 toward the at the narrower end 22. FIG. 3 also shows the positioning marking 26, located at the end of the locking plate 4, 44 where the pull opening 19 is.

FIGS. 5-6e illustrate an example of a second embodiment. In this embodiment, the first engagement component 43a on the filter housing wall is an inclined push edge 46a comprised in a push opening 50. As shown in FIGS. 6a and 6b, the push opening can be provided in a push opening element 41 attached to the filter hosing wall. If desired the push opening element can be a separate component that is attached to a retainer bracket 51 on the filter housing. The second engagement component 48a, which is arranged in the locking plate, is a retainer bracket 42a. The locking plate 44 has clamping surface 45, which extends along a longitudinal side of the locking plate and is adapted to abut the rear side of the wall structure 20. Also in this embodiment the clamping system can include two locking plates.

The locking plate is configured to cooperate with a puller in the same way as described for the first embodiment, via an abutment surface 47 in the locking plate. The abutment surface 47 is comprised in a pull opening 49 arranged in the locking plate. Also in the second embodiment, the clamping system can include an upper and a lower set of engagement components 48a, 48b. A positioning marking 52 can be located at an upper end of the locking plate 44.

The invention claimed is:

1. A clamping system (1) for mounting a filter housing (10) to a wall structure (20), said clamping system including
a filter housing clamping flange (2) arranged on a front side of the filter housing (10), and being adapted to abut a front side (20a) of the wall structure (20);
a first locking plate (4, 44) having a longitudinal direction (y), and including a locking plate clamping surface (5, 45) extending along a longitudinal side of the locking plate (4) and being adapted to abut a rear side (20b) of the wall structure (20);
a first engagement component (3a, 43a) associated with a filter housing wall (11) on a distance from the filter housing clamping flange (2); and
a puller (6),
said locking plate being configured to cooperate with the puller (6) via an abutment surface (7) associated with the locking plate (4; 44) and being adapted to engage with a part of the puller (6), and said locking plate (4; 44) further being configured to cooperate with the first engagement component (3a, 43a) via a second engagement component (8a, 48a) arranged in the locking plate,
wherein one of said first and second engagement components (3a, 43a; 8a, 48a) is a retainer bracket (12a, 42a), and the other of said first and second engagement components (3a, 43a; 8a, 48a) is a push edge (13a, 46a) comprised in a push opening (14a, 50), said push edge (13a, 46a) being an inclined edge adapted to engage with the retainer bracket,
said puller (6) being configured to manipulate the abutment surface (7, 47) so as to move the locking plate (4, 44) in the longitudinal direction thereof, such that the inclined push edge (13a, 46a) of the push opening and the retainer bracket (12a, 42a) interact to push the locking plate (4) in a transverse direction thereof and toward the filter housing clamping flange (2), thus clamping the wall structure (20) between the filter housing clamping flange (2) and the locking plate clamping surface (5, 45).

2. The clamping system of claim 1, wherein the puller (6) comprises a puller element (15) and a support element (16) connected to the puller element (15) via a distance regulating component (17), which is configured to act on the puller element (15) and the support element (16) to force the puller element (15) away from the support element (16).

3. The clamping system of claim 2, wherein the support element is adapted to rest against and be supported by an external surface (18) of the filter housing (10).

4. The clamping system of claim 3, wherein distance regulating component (17) is a screw rod connected to the puller element (15) via a screw connection.

5. The clamping system of claim 1, wherein the abutment surface (7, 47) is comprised in a pull opening (19, 49) arranged in the locking plate (4, 44) and wherein said puller (6) is adapted to be inserted into the pull opening (19, 49) and to abut against the abutment surface (7, 47).

6. The clamping system of claim 1, wherein the first and second engagement components (3a, 43a; 8a, 48a) form a first set of engagement components, and wherein the clamping system further comprises a second set of engagement components comprising a third and a fourth engagement component (3b, 43b; 8b, 48b) located on the filter housing wall (11) and on the locking plate (4, 44), respectively, and having the same configuration as the first and second engagement components (3a, 43a; 8a, 48a), and being positioned on a distance from the first set of engagement components in the longitudinal direction (y) of the locking plate (4, 44).

7. The clamping system of claim 1, wherein the push opening (14a) has a wider end (21) at an end closest to the abutment surface (7), and a narrower end (22) farthest from the abutment surface (7), said wider end (21) having a width (w1) in a transverse direction of the locking plate (4), which is greater than a width (w2) of the narrower end (22).

8. The clamping system of claim 7, wherein the push opening (14a) comprises an insertion part (23) at the wider end (21) thereof, and a tapering part (24) extending from the insertion part (23) toward the narrower end (22), where the tapering part (24) is delimited on a side closest to the clamping surface (5) by the inclined push edge (13a).

9. The clamping system of claim 1, further comprising a positioning marking (26, 52) located at an end of the locking plate (4, 44) where a pull opening (19) is located, and on a distance in the longitudinal direction (y) from the second engagement component (8a, 48a), which corresponds to the distance in the longitudinal direction (y) between the first engagement component (3a, 43a) associated with the filter housing wall (11) and an external surface (18) of the filter housing (10).

10. The clamping system of claim 1, further comprising a second locking plate (4'), having the same but mirrored configuration as the first locking plate (4), thus being configured to engage with the filter housing and clamp it against the wall structure (20) in the same way as the first locking plate (4), said puller (6) being configured to abut an abutment surface (7') arranged on the second locking plate (4'), so as to simultaneously manipulate both abutment surfaces (7; 7') of the first and second locking plates (4; 4') so as to move them in a longitudinal direction, thereby causing a movement of the locking plates in a transverse direction toward the wall structure (20).

11. A clamping assembly for use in the clamping system of claim 1, said clamping assembly comprising the first locking plate (4, 44) and the puller (6) of said clamping system, said first locking plate (4, 44) and puller (6) being configured to cooperate with a filter housing (10) and a wall structure (20) to clamp the filter housing (10) to the wall structure (20),
said first locking plate (4, 44) including an abutment surface (7, 47) and at least one engagement component (8a, 48a; 8b, 48b) arranged thereon, said at least one engagement component being
a retainer bracket (42a) adapted to engage with an inclined push edge (46a) positioned on the filter housing (10); or
an inclined push edge (13a) comprised in a push opening (14a), said inclined push edge (13a) being adapted to engage with a retainer bracket (12a) positioned on the filter housing (10), and;
said puller (6) being configured to abut the abutment surface (7, 47) of the first locking plate (4, 44) and being configured to manipulate the abutment surface (7, 47) so as to move the locking plate (4, 44) in the longitudinal direction thereof, such that the inclined push edge (13a, 46a) and the retainer bracket (12a, 42a) interact to push the locking plate (4) in a transverse direction thereof.

12. The clamping assembly of claim 11, wherein the puller (6) comprises a puller element (15) and a support element (16) connected to the puller element (15) via a distance regulating component (17), which is configured to act on the puller element (15) and the support element (16) so force the puller element (15) away from the support element (16), said distance regulating component (17) preferably being a screw rod connected to the puller element (15) via a screw connection.

13. The clamping assembly of claim 11, wherein the push opening (14a) has a wider end (21) at an end closest to the abutment surface (7), and a narrower end (22) farthest from the abutment surface (7), said wider end (21) having a width (w1) in a transverse direction of the locking plate (4), which is greater than the width (w2) of the narrower end (22), and wherein the push opening (14a) preferably comprises an insertion part (23) at the wider end (21) thereof, and a tapering part (24) extending from the insertion part (21) toward the at the narrower end (22), where the tapering part (24) is delimited on a side closest to the clamping surface (5) by the inclined push edge (13a).

14. The clamping assembly of claim 11, wherein the locking plate (4, 44) further comprising a positioning marking (26, 52) located at an end of the locking plate (4, 44) where the pull opening (19) is located, and on a distance from the second engagement component in a longitudinal direction (y) of the locking plate, which distance corresponds to the distance in the longitudinal direction (y) between the first engagement component (3a, 43a) associated with a filter housing wall (11) and an external surface (18) of the filter housing (10).

15. The clamping assembly of claim 11, further comprising a second locking plate (4'), having the same but mirrored configuration as the first locking plate (4), said puller (6) being configured to abut an abutment surface (7') arranged on the second locking plate (4'), so as to simultaneously manipulate both abutment surfaces (7; 7') of the first and second locking plates (4, 4').

16. The clamping assembly of claim 11, wherein said abutment surface (7, 47) is comprised in a pull opening (19, 49) arranged in the locking plate (4, 49) and said puller (6) is adapted to be inserted into the pull opening (19, 49) and to abut against the abutment surface (7, 47).

* * * * *